United States Patent
Elenes

(10) Patent No.: US 8,155,610 B2
(45) Date of Patent: Apr. 10, 2012

(54) COMBINING MULTIPLE FREQUENCY MODULATION (FM) SIGNALS IN A RECEIVER

(75) Inventor: Javier Elenes, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 907 days.

(21) Appl. No.: 12/156,275

(22) Filed: May 30, 2008

(65) Prior Publication Data

US 2009/0298453 A1 Dec. 3, 2009

(51) Int. Cl.
*H04B 1/16* (2006.01)

(52) U.S. Cl. ........ 455/205; 455/137; 455/132; 455/504; 455/502; 455/272; 375/347; 375/142

(58) Field of Classification Search .......... 455/205, 455/137, 132, 504, 502, 272; 375/347, 142
See application file for complete search history.

(56) References Cited

U.S. PATENT DOCUMENTS

| | | | |
|---|---|---|---|
| 6,069,912 A | 5/2000 | Sawahashi et al. | |
| 6,236,844 B1* | 5/2001 | Cvetkovic et al. | 455/273 |
| 6,393,083 B1 | 5/2002 | Beukema | |
| 6,760,386 B2* | 7/2004 | Li et al. | 375/267 |
| 2002/0061051 A1 | 5/2002 | Kitahara | |
| 2002/0131536 A1* | 9/2002 | Veillette | 375/347 |
| 2007/0036249 A1 | 2/2007 | Shatara et al. | |

FOREIGN PATENT DOCUMENTS

| | | |
|---|---|---|
| EP | 0 716 513 A1 | 12/1996 |
| JP | 2005269026 | 9/2005 |

OTHER PUBLICATIONS

PCT/US2009/044759 International Search Report with Written Opinion of the International Searching Authority mailed Jan. 5, 2010.
German Patent and Trademark Office, Office Action mailed Aug. 29, 2011 in German application No. 11 2009 001 362.7.

* cited by examiner

*Primary Examiner* — Sanh Phu

(74) *Attorney, Agent, or Firm* — Trop, Pruner & Hu, P.C.

(57) ABSTRACT

In one embodiment, the present invention provide a method for detecting signal quality metrics of a constant modulo (CM) signal received in two different signal paths, and combining the signal from the two signal paths based at least in part on the detected first and second signal quality metrics. Such method may be implemented in a radio receiver such as an automobile receiver.

18 Claims, 4 Drawing Sheets

COMBINING MULTIPLE FREQUENCY MODULATION (FM) SIGNALS IN A RECEIVER

BACKGROUND

In radios, particularly mobile radios such as a frequency modulation (FM) radio, signal quality can become impaired in the presence of multipath fading. Multipath fading is an impairment commonly observed in which multiple versions of the transmitted signal arrive at the receiver with different phase, delay and attenuation levels, resulting in destructive interference at the receiver. This destructive interference can negatively impact the quality of the radio output.

Existing techniques to address fading issues include so-called antenna diversity techniques in which multiple antennas, typically two such antennas, are connected to the same radio receiver. and the output of one of the multiple antennas is selected for processing and demodulation. Different varieties of such diversity techniques exist, but all typically include multiple antennas that may be positioned at different phases such that if one of the antennas suffers from fading, the other antenna is unaffected. Typically, selection between the two antenna paths is based on a monitored metric of the incoming signal from the various antennas. However, such techniques are suboptimal.

SUMMARY OF THE INVENTION

According to one aspect of the present invention, a method includes detecting signal quality metrics of a constant modulo (CM) signal received in two different signal paths, and combining the CM signal from the two signal paths based at least in part on the detected first and second signal quality metrics. In this way, improved resistance to fading can be realized, as the detected CM signal having a greater signal quality metric can have a greater weight in the combined CM signal.

Yet another aspect of the present invention is directed to an apparatus to combine baseband CM signals such as frequency modulation (FM) signals obtained from different analog front ends that receive and downconvert the FM signals to FM baseband signals. The apparatus further includes a detector to measure a signal quality metric of the first FM baseband signal, a phase discriminator to receive the first FM baseband signal and the second FM baseband signal and to determine a phase difference between them, and a feedback loop to adjust a phase of the second FM baseband signal using the phase difference. Still further, the apparatus may have a combiner to combine the baseband signals based at least in part on the signal quality metrics. To combine the baseband signals, multiple amplifiers may have their gain controlled by determined weightings for the FM baseband signals, the outputs of which can be combined. In certain implementations, the apparatus may be an integrated circuit FM receiver to handle the above processing (including the radio processing for a first baseband signal), and which is coupled to another integrated circuit FM receiver to receive another FM baseband signal.

A still further aspect of the present invention is directed to a system that includes a first receiver including a first analog front end to receive a constant modulo (CM) signal and to downconvert the CM signal to a first CM baseband signal, a first detector to measure a first signal quality metric of the first CM baseband signal, a second detector to measure a second signal quality metric of a second CM baseband signal received from a second receiver, and a combiner to combine the first and second CM baseband signals based at least in part on first and second signal quality metrics The system also may include the second receiver, itself including a second analog front end to receive the CM signal and to downconvert it to the second CM baseband signal. In such a system, only minimal communication may occur between receivers, each of which may be located in a different integrated circuit, as may be implemented in a car radio system.

DETAILED DESCRIPTION

In various embodiments, multiple antenna paths may be provided in a FM radio. Signal information from these multiple paths may be combined in a predetermined manner based on the relative quality levels of the signals to provide to a demodulator a combined signal having improved linearity with respect to multipath fading. While the scope of the present invention is not limited in this regard, some implementations may use a maximal-ratio combining (MRC) method to combine signal information from the multiple signal paths. Still further, while the implementations described herein are in the context of FM radios, embodiments may be used in other communication protocols such as other constant modulo (CM) communications, e.g., via receipt and processing of CM signals.

Implementations may vary. However, certain implementations may be used for automotive radios. In such an automotive system, multiple antennas may be provided, with the output of each antenna provided to a separate and independent signal path. In certain implementations, such signal paths may be present in different integrated circuits (ICs) although in other implementations multiple signal paths may be formed in a single IC, either on separate die of the IC or on a single IC die. Based on one or more quality metrics associated with the signals, embodiments may combine the signal information from the multiple paths in a predetermined manner to provide a signal output that can be coupled to demodulator circuitry, which may be present in one of the ICs (in a multiple IC implementation) or part of the single IC (in a single IC implementation). In yet other implementations, the demodulator may be part of a different integrated circuit.

Figure 1:
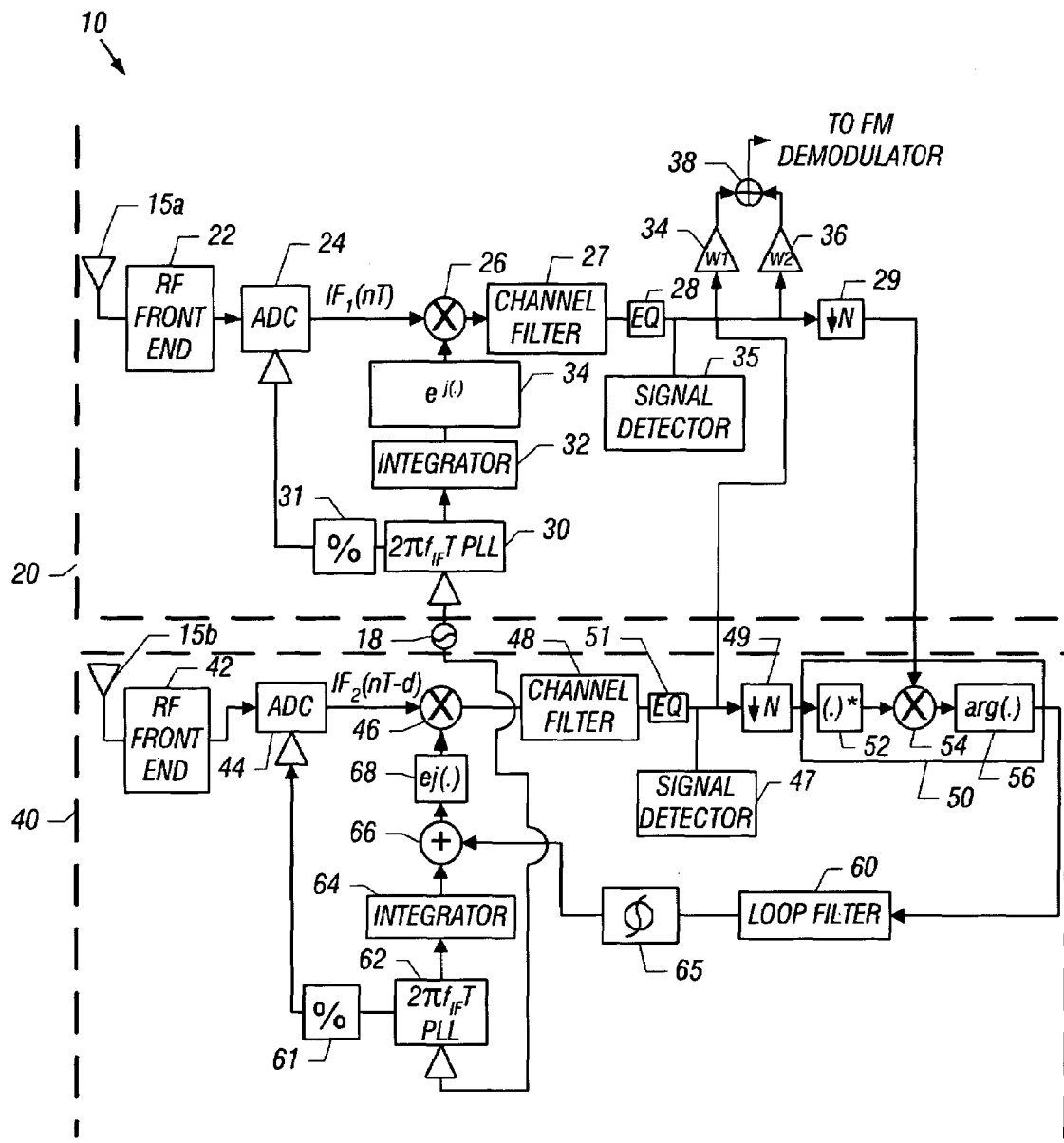
FIG. 1 is a high level block diagram of a system in accordance with one embodiment of the present invention.

Referring now to FIG. 1, shown is a high level block diagram of a system in accordance with one embodiment of the present invention. As shown in FIG. 1, system 10 may be a representation of a car radio having multiple signal paths. In system 10, two antennae are shown, namely antennas 15$_a$ and 15$_b$ (generically antenna 15). While shown for ease of illustration as including two antennas and two signal paths, embodiments are not limited in this regard and more antennas and signal paths may be present in other embodiments. For example, in some systems up to six such antennas and signal paths may be present.

Reference is now made to the first signal path, which is present in a first integrated circuit (IC) 20, which may be a combined AM/FM receiver including both analog and digital circuitry, e.g., a mixed-signal circuit that can tune to a desired signal channel and process the downconverted signal information to provide audio outputs. As shown in FIG. 1, IC 20 includes an analog radio frequency (RF) front end 22 coupled to receive RF signals from antenna $15_a$. In various embodiments, front end 22 may include a low noise amplifier (LNA), filters, programmable gain amplifiers (PGAs), and a mixer, which can downconvert the RF signal to an intermediate frequency (IF) or baseband, among other such circuitry. The output of RF front end 22, which may be a IF signal, is coupled to an analog-to-digital converter (ADC) 24, which samples the RF information according to a sampling signal received from, e.g., a phase lock loop (PLL) 30 and via a frequency divider 31. PLL 30 may be driven responsive to an incoming reference signal from an off-chip oscillator 18. Oscillator 18, which may be a crystal oscillator, voltage controlled oscillator (VCO) or other such oscillation mechanism, provides a reference frequency to PLL 30 that in turn generates an intermediate frequency signal to a clock path that generates a mixing signal for use in downconversion of the incoming RF signals.

ADC 24 thus provides digitized signals ($IF_1(nT)$), which as shown in FIG. 1 may be at an IF level. These signals are provided to a mixer 26, which downconverts the signals to baseband. The mixing signal may be provided to mixer 26 from a clock path including PLL 30, an integrator 32 and an exponential function 34, which thus provides an IF signal to mixer 26 to enable the mixer to provide a baseband output corresponding to the modulated message information present in the RF signal. This signal may be provided to a channel filter 27 which performs channel filtering to thus remove noise and other non-desired information outside a band of interest. Channel filter 27 may thus channelize the signal to reject out-of-band channels. Note that in FIG. 1, the thicker lines refer to complex signals and the thinner lines refer to real valued signals. Also, note that in some embodiments all portions of the signal path after ADC 24 may be implemented digitally, e.g., within a digital signal processor (DSP).

As further shown in FIG. 1, a channel equalizer 28 may also be present and coupled to an output of channel filter 27. With such a channel equalizer, in addition to flat fading, frequency-selective fading may also be resolved using embodiments of the present invention. Note that for frequency-selective fading the channel thus may be equalized, e.g., to undo the effects of the channel before combining.

Also shown in FIG. 1, a signal detector 35 may be coupled to an output of equalizer 28 to determine one or more signal quality metrics associated with the filtered signal. In various implementations, signal detector 35 may be a signal-to-noise ratio (SNR) detector, received signal strength detector, such as an RSSI detector, or other such signal quality measure.

The filtered information from equalizer 28 may be coupled to a first amplifier 36, the details of which will be discussed further below. Still further, to enable determination of a phase difference between the multiple signal paths, this information may also be provided, through, e.g., a decimator 29, to a second IC 40, which includes the second signal path. Note that decimator 29 may be optional and can be removed in implementations in which processing efficiency is a concern.

While shown as being provided to second IC 40, in some implementations to reduce the amount of inter-chip communication and any noise that may result therefrom, the phase difference determination that will be described below with regard to second IC 40 may be instead performed in first IC 20.

Still referring to FIG. 1, second IC 40 is coupled to receive incoming RF signals from second antenna $15_b$. Note that the FM signal obtained in both paths is the same (i.e., includes the same message content), but each may have different fading profiles and may also be at different phases. The front end of second IC 40 may include an RF front end 42 configured similarly to that of first IC 20, in addition to an ADC 44 sampled by a sampling clock from divider 61. Note that the IF signal output from ADC 44 may be at a phase delay with respect to the IF signal output of ADC 24, although both ADCs may operate at the same sampling frequency (i.e., the first IF signal, $IF_1$, is at a phase of nT, while the second IF signal (i.e., $IF_2$) is at a phase of (nT-d)). Second IC 40 similarly includes a mixer 46 to downconvert the IF signals to baseband, a channel filter 48, an equalizer 51, a decimator 49, and a signal detector 47. As mentioned above, in some implementations a channel equalizer may also be present.

To enable determination of a phase difference between the two signal paths and to align these signals paths in phase, second IC 40 may include a phase discriminator 50. As shown in FIG. 1, phase discriminator 50 may include a complex conjugate function 52 to obtain a complex conjugate of the incoming second signal information. A complex conjugate may act to generate a negative of the imaginary part of a complex signal, in other words a complex number $ae^{j\Theta}$ may be transformed into $ae^{-j\Theta}$. A multiplier 54 then may perform a complex multiplication between the first signal and the second signal, and an exponential operator 56, which may be implemented using a coordinate rotation digital computer (CORDIC) function, provides a phase difference between the two signals, namely $data_1 - data_2$. Assume that the first input to multiplier 54 from first IC 20 is $S_1 e^{j\Theta_1}$ and the second signal from IC 40 is $S_2 e^{j\Theta_2}$. A complex conjugate of the second signal is taken in complex conjugate function 52 to obtain $S_2 e^{-j\Theta_2}$. The complex numbers are then multiplied in multiplier 54 to obtain a product $S_1 e^{j\Theta_1} S_2 e^{j\Theta_2}$. When the angle portion is obtained using the CORDIC function, the phase difference $\Theta_1 - \Theta_2$ is obtained.

This instantaneous phase difference value may vary widely. Accordingly, the phase difference information may be provided to a loop filter 60 to smooth this information and thus provide a filtered phase difference. Loop filter 60 thus takes the average and applies a correction proportional to the average of the phase difference in the opposite direction, such that eventually the phases converge. The loop filter output may be accumulated in an integrator 65, the output of which is passed to summer 66. Summer 66 may thus compensate the mixing signal path to align phases between the first and second signal paths. As shown in FIG. 1, this mixing signal path includes a PLL 62 (also coupled to off-chip oscillator 18), an integrator 64 and an exponential function 68. While shown as being applied between integrator 64 and exponential function 68, understand that a phase correction value can be applied in other locations. For example, the phase correction information may be applied to the channel filtered output of channel filter 48.

As shown in FIG. 1 note that the second signal from the equalizer output is also provided from second IC 40 to first IC 20, and more specifically, to a second amplifier 34, details of which will be discussed further below.

As described above, signal information for both signal paths may be combined to thus provide a combined signal to a demodulator. In different implementations, various manners of combining these signals may be realized. In one particular implementation a maximal-ratio combining (MRC) may be performed, based on one or more signal quality metrics associated with the signals. For example, in one implementation, first amplifier 36 and second amplifier 34 may be weighted such that different gains are applied to the incoming signals from the first and second signal paths, based on the relative quality of the two signals. In one particular embodiment, first amplifier 36 may apply a gain to the signal associated with a weighting W1, where weighting W1 is determined in accordance with the following Equation 1:

$$W1=SNR1/(SNR1+SNR2) \qquad [EQ. 1]$$

where SNR1 is a signal-to-noise ratio (SNR) of the first signal, and SNR2 is an SNR of the second signal. In turn, second amplifier 34 may apply a gain to the second signal in accordance with a second weighting, W2. In one such embodiment, the second weighting may be in accordance with Equation 2:

$$W2=1-W1 \qquad [EQ. 2].$$

Other algorithms may be used to weight signals when more than two receivers are present. For example, in a multi-receiver system such as a four-receiver system, the relative weighting of each path may be determined in accordance with Equation 3:

$$Wx = SNRx \bigg/ \sum_{x=1}^{4} SNRx \qquad [EQ. 3]$$

where Wx and SNRx equals the weighting and SNR for a given receiver.

While described with these particular weighting algorithms, other embodiments may apply different such algorithms. Furthermore, instead of using SNR as a quality metric, other embodiments may use a received signal strength (RSSI). Referring still to FIG. 1, the gained outputs of amplifiers 34 and 36 may be provided to a combiner 38, where the signals are combined and then provided to further circuitry, e.g., a demodulator, which as discussed above may be within first IC 20 or another component of system 10. In other implementations instead of the separate equalizers in both ICs, if the channel can be assumed to be the same for both of antennas $15_a$ and $15_b$, a single equalizer may be placed at the output of combiner 38.

Figure 2:
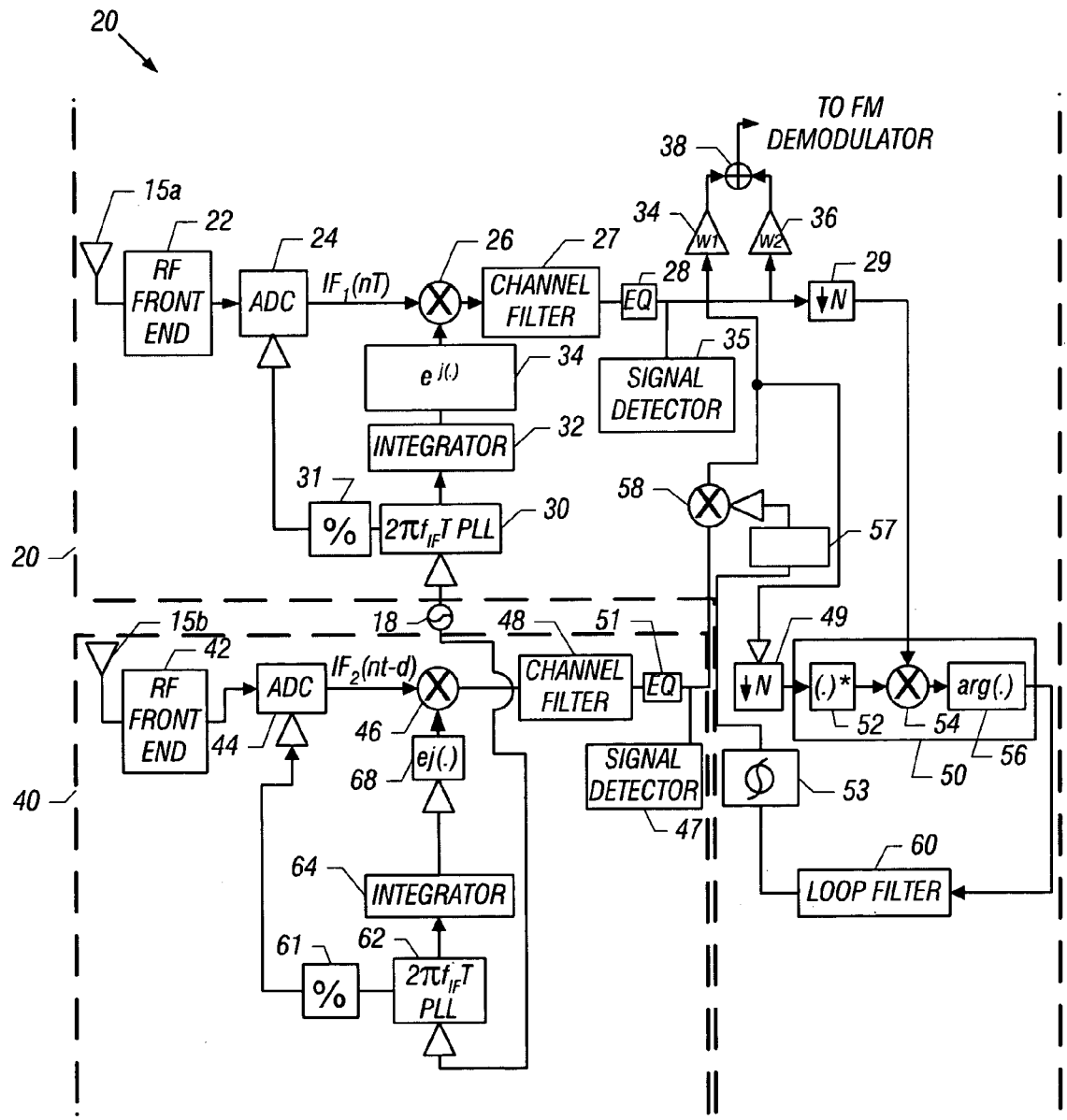
FIG. 2 is a block diagram of a system in accordance with another embodiment of the present invention.

Referring now to FIG. 2, shown is a block diagram of a system in accordance with another embodiment of the present invention. As shown in FIG. 2, system 10' may similarly include two separate receivers, adapted into separate ICs. For reference purposes, components are numbered with the same reference numerals as the corresponding components of FIG. 1. However, in the implementation of FIG. 2, the signal information from second IC 40 is communicated to first IC 20, which performs the phase difference determination to thus reduce the amount of inter-IC communication. That is, in contrast to the embodiment of FIG. 1, there is no need for transmitting any information from first IC 20 to second IC 40. As such, the bi-directional path present in system 10 can be avoided in system 10' of FIG. 2, and only a single direction communication channel may be present, potentially reducing the amount of noise resulting from such communications.

As shown in FIG. 2, the front end paths of both receivers are the same as set forth in FIG. 1. However, note that in the implementation of FIG. 2, first IC 20 includes the phase discriminator 50 and loop filter 60 (and signal detector 47 for the second path signal). Accordingly, the only communication from second IC 40 to first IC 20 is the output of equalizer 51, which is applied to a multiplier 58. Note that the output of multiplier 58 is provided, in addition to amplifier 34, to decimator 49 for input into phase discriminator 50. As further shown in FIG. 2, the filtered phase difference information generated by loop filter 60 may be provided to an integrator 53 and then to an exponential function 57, for conversion from polar information to rectangular information. This rectangular information is then provided to multiplier 58, where it is combined with the signal information from second IC 40, the output of which is in turn coupled to second amplifier 34. In other respects, system 10' may be adapted similar to that discussed above regarding system 10 of FIG. 1.

Note that in some implementations the differences shown in FIGS. 1 and 2 may be realized using software, firmware, or combinations thereof. That is, in some implementations the first and second ICs may have identical or substantially identical hardware components, and one of the chips may be configured by software or firmware to act as a master (such as first IC 20 in FIG. 2) and a second IC to act as a slave (i.e., second IC 40 of FIG. 2). However in other implementations, the hardware of the different ICs may be differently configured to reduce costs associated with die area and circuitry.

In some implementations, more than two such ICs may be present. These implementations may be arranged such as the configuration shown in FIG. 2, so that a single IC acts as a master IC for all such receivers, and is adapted to receive baseband signal information from a plurality of other receivers, which may be different FM receivers, each associated with an antenna located at a different portion of an automobile. For example, in some implementations multiple FM antennas may be present, e.g., in a windshield, an external vehicle antenna, side mirrors, and other such locations. To this end, the master IC may include multiple phase discriminators, each adapted in similar fashion to that shown with regard to phase discriminator 50 of FIG. 2. Similarly, multiple controllable amplifiers, each weighted in accordance with a weight combining algorithm such as the MRC algorithm discussed above, may be present to output a gain adjusted signal from each antenna path, all of which may be combined in a final combiner for output to a demodulator or other such circuitry.

Figure 3:
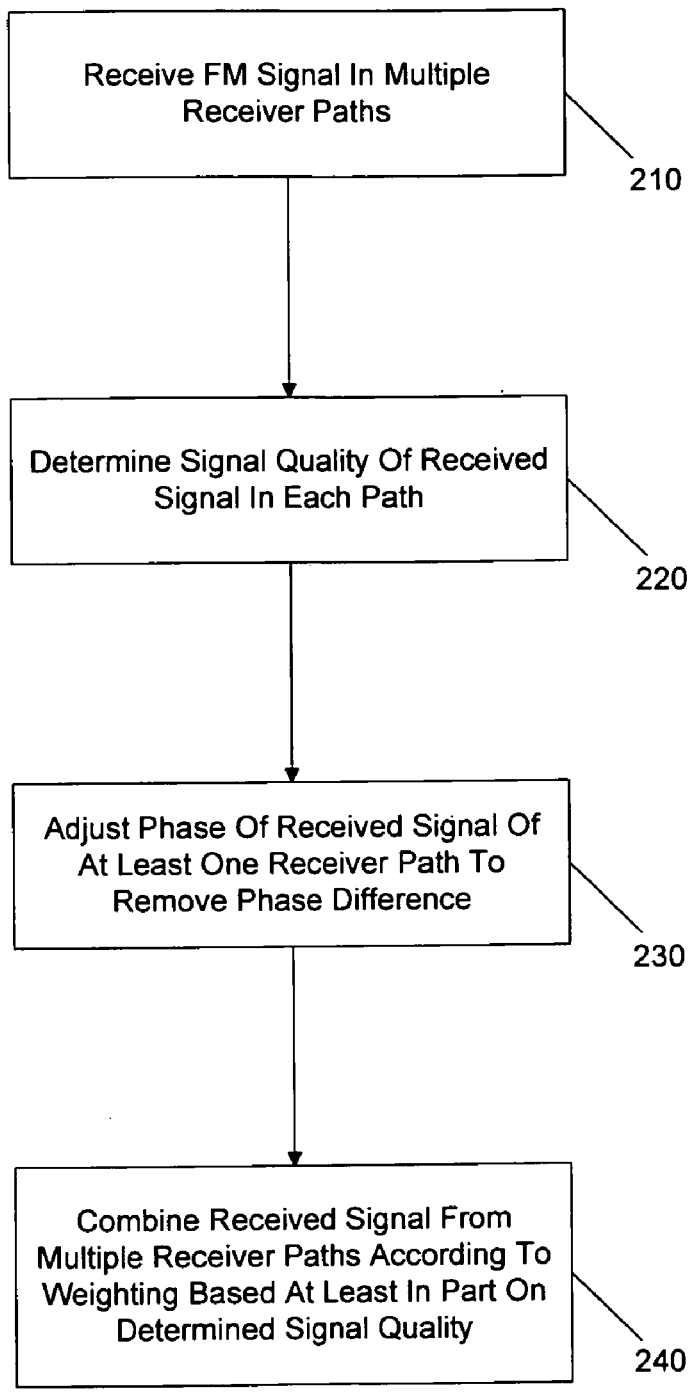
FIG. 3 is a flow diagram of a method in accordance with one embodiment of the present invention.

Referring now to FIG. 3, shown is a flow diagram of a method in accordance with one embodiment of the present invention. As shown in FIG. 3, method 200 may be used to process an FM signal received in multiple receivers of a system. Method 200 may begin by receiving the FM signal in multiple receiver paths (block 210). As described above, in various implementations multiple receivers each adapted on a separate integrated circuit, may each be coupled to a different antenna, each of which may be located at a different position within an automobile, and thus possibly subject to different fading and other varying signal conditions.

The received signals are then processed in the multiple receiver paths, such as discussed above regarding FIGS. 1 and 2. As part of the processing, one or more signal quality metrics may be determined for the received signal in each path (block 220). Still further, in some implementations a phase of at least one of the received signals may be adjusted to remove a phase difference between multiple paths (block 230). For example, in a two receiver implementation, a phase difference between the two paths may be compensated using a feedback loop, such as shown in FIGS. 1 and 2. Then, the received signals from these multiple receiver paths may be combined (block 240). More specifically, in one embodiment these received signals may be combined according to a weighting based at least in part on the determined signal quality. For example, an algorithm may apply Equations 1 and 2, or 3 described above to thus apply a different weighting to the received signal in each of the receiver paths to obtain a combined signal, which can then be provided to further radio circuitry, such as a demodulator, which may be on a single IC with one of the receivers, or may be a separate IC. While described with this particular implementation in the embodiment of FIG. 3, the scope of the present invention is not limited in this regard.

Thus embodiments may apply diversity combining to an FM signal, where there is no known information but instead data is embedded in a constant modulus signal. This is in contrast to diversity applications such as for digital modulation schemes where there is a known pattern embedded in the sequence, such as a known preamble or training data, that can be used to control diversity.

Figure 4:
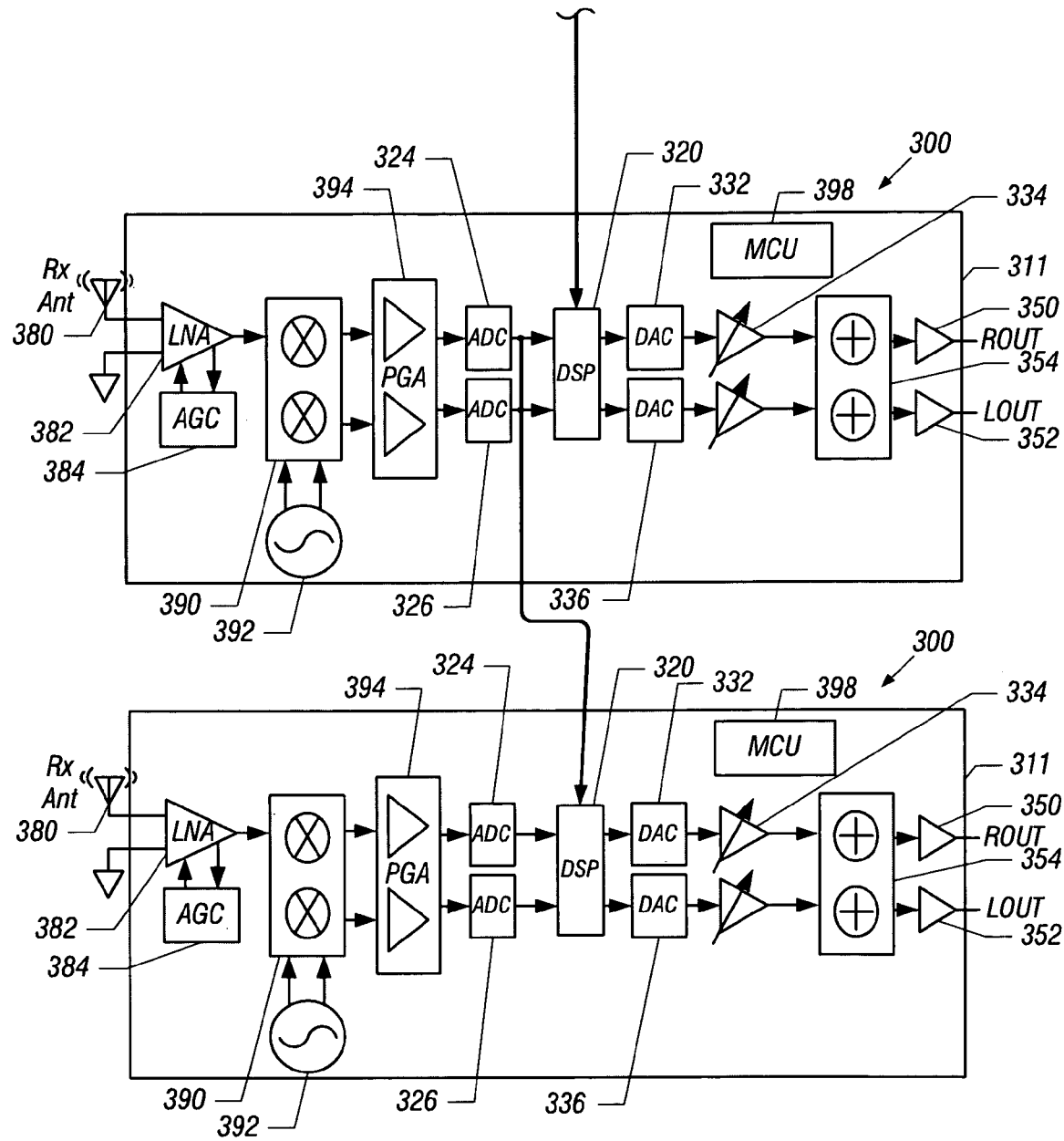
FIG. 4 is a block diagram of a multi-receiver system in accordance with an embodiment of the present invention.

Embodiments may be implemented in many different receivers, transceivers and so forth. In some implementations, a radio receiver capable of both AM and FM receive modes, among others, may implement embodiments of the present invention. Referring now to FIG. 4, shown is a block diagram of a multi-receiver system 400 in accordance with an embodiment of the present invention. In one embodiment, system 400 may be a mobile radio such as a car radio including multiple receivers (e.g., 300 and 300') each formed in a separate IC and adapted on a circuit board or other supporting circuitry of the system. As shown in FIG. 4, a first multimode combined AM/frequency modulation (FM) receiver 300 may be fabricated on a monolithic semiconductor die.

An incoming RF signal is received from an external receive antenna 380 through a low noise amplifier (LNA) 382 controlled by an automatic gain control (AGC) circuit 384. After processing, left channel (called "LOUT") and right channel (called "ROUT") analog stereo signals appear at output terminals 352 and 350, respectively.

The multimode receiver 300 includes analog mixers 390 that are coupled to a tunable local oscillator 392, the frequency of which selects the desired radio channel to which the receiver 300 is tuned. In response to the incoming RF signal, the mixers 390 produce corresponding analog IF, quadrature signals that pass through programmable gain amplifiers (PGAs) 394 before being routed to the ADCs 324 and 326. Thus, the ADCs 324 and 326 convert the analog IF quadrature signals from the PGAs 394 into digital signals, which are provided to a DSP 320.

The DSP 320 demodulates the received complex signals to provide corresponding digital left and right channel stereo signals at its output terminals; and these digital stereo signals are converted into analog counterparts by DACs 332 and 336, respectively, which are coupled to programmable gain amplifiers 334. In addition, DSP 320 may receive baseband signals from one or more other receivers such as receiver 300' and combine the signals from these paths prior to demodulation, as described above. However, in some operation modes, DSP 320 may be controlled to not combine signals and only use a signal from a single path, or only combine signals from a predetermined number of available signals paths. Such control may be preset in a factory, or may be user controlled, in some implementations.

While not shown in FIG. 4, the receiver 300 can include a control interface to receive various signals that control the mode (AM or FM receive, or other) in which the receiver 300 is operating, as well as a specific submode configuration for the mode. For example, different firmware present in the DSP 320 may be executed based on the selected mode of operation. In accordance with some embodiments of the invention, the multimode FM receiver 300 may also include a microcontroller unit (MCU) 398 that coordinates the general operations of the receiver 300, such as configuring the receiver for multiple-receiver combining operations.

As further shown in FIG. 4, a second receiver 300' may also be present in a given system implementation. In addition to having a receiver path configured the same as that of receiver 300, a digital output from ADC 324 of receiver 300' may be provided, e.g., through a digital audio interface or otherwise connected to receiver 300, and more particularly to DSP 320 of receiver 300 to enable combining of signal information from multiple paths. As such, embodiments may include an article in the form of a computer-readable medium onto which instructions are written. These instructions may enable the DSP or other programmable processor to perform phase discrimination and adjusting as well as weighting and combining of incoming signals from multiple receiver paths, and other processing in accordance with an embodiment of the present invention.

Note that additional receivers may be present, each associated with a different received antenna to provide signal information from multiple paths to improve receive conditions in the presence of fading or other signal impairments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   detecting a first signal quality metric of a constant modulo (CM) signal received in a first signal path;
   detecting a second signal quality metric of the CM signal received in a second signal path;
   compensating a phase of the second signal path CM signal to set the second signal path CM signal phase substantially equal to a phase of the first signal path CM signal; and
   combining the CM signal from the first and second signal paths based on the detected first and second signal quality metrics.

2. The method of claim 1, further comprising combining the first signal path CM signal and the second signal path CM signal such that the CM signal having a greater signal quality metric has a greater weight in the combined CM signal.

3. The method of claim 2, further comprising providing the combined CM signal to a demodulator.

4. The method of claim 1, further comprising combining the first signal quality metric and the second signal quality metric according to a first algorithm to obtain a first weighting for the first signal path CM signal and a second weighting for the second signal path CM signal.

5. The method of claim 4, wherein the first algorithm is to apply the first weighting to the first signal path CM signal corresponding to a ratio between the first signal quality metric and a sum of the first signal quality metric and the second signal quality metric.

6. The method of claim 1, further comprising aligning phases of the first signal path CM signal and the second signal path CM signal in a feedback loop of a first receiver including the first signal path.

7. An apparatus comprising:
   a first analog front end to receive an incoming frequency modulation (FM) signal and to downconvert the incoming FM signal to a first FM baseband signal;
   a first detector to measure a first signal quality metric of the first FM baseband signal;
   a phase discriminator to receive the first FM baseband signal and a second FM baseband signal from a second analog front end and to determine a phase difference between the first and second FM baseband signals;
   a feedback loop to adjust a phase of the second FM baseband signal using the phase difference; and a combiner to combine the first FM baseband signal and the second FM baseband signal based at least in part on the first signal quality metric and a second signal quality metric associated with the second FM baseband signal.

8. The apparatus of claim 7, wherein the combiner includes a first amplifier having a gain controlled by a first weighting for the first FM baseband signal and a second amplifier having a gain controlled by a second weighting for the second FM baseband signal, and a summer to combine the first and second amplifier outputs.

9. The apparatus of claim 7, wherein the apparatus is a first integrated circuit FM receiver, and further comprising a second integrated circuit FM receiver coupled to the first integrated circuit FM receiver to provide the second FM baseband signal.

10. The apparatus of claim 9, wherein the first integrated circuit FM receiver and the second integrated circuit FM receiver are both to receive the incoming FM signal.

11. The apparatus of claim 7, wherein the feedback loop includes a loop filter to filter an instantaneous phase difference output of the phase discriminator and an exponential generator to receive the filtered phase difference output and to provide a first multiplicand to a multiplier.

12. The apparatus of claim 11, wherein the multiplier is to receive the first multiplicand and a second multiplicand corresponding to the second FM baseband signal.

13. A system comprising:
a first receiver including a first analog front end to receive a constant modulo (CM) signal and to downconvert the CM signal to a first CM baseband signal, a first detector to measure a first signal quality metric of the first CM baseband signal, a second detector to measure a second signal quality metric of a second CM baseband signal received from a second receiver, and a combiner to combine the first CM baseband signal and the second CM baseband signal based at least in part on the first signal quality metric and the second signal quality metric; and
the second receiver coupled to the first receiver, the second receiver including a second analog front end to receive the CM signal and to downconvert the CM signal to the second CM baseband signal and to provide the second CM baseband signal to the first receiver on a first signal line that is the only communication path between the first receiver and the second receiver.

14. The system of claim 13, wherein the first receiver and the second receiver are each located in a different integrated circuit.

15. The system of claim 14, wherein the first receiver is to be coupled to a first antenna of an automobile and the second receiver is to be coupled to a second antenna of the automobile.

16. The system of claim 14, wherein the combiner includes a first amplifier having a gain controlled by a first weighting for the first CM baseband signal and a second amplifier having a gain controlled by a second weighting for the second CM baseband signal, and a summer to combine the first and second amplifier outputs.

17. The system of claim 15, wherein the first receiver further comprises:
a phase discriminator to receive the first CM baseband signal and the second CM baseband signal and to determine a phase difference between the first and second CM baseband signals, the CM signal corresponding to a frequency modulation (FM) signal; and
a feedback loop to adjust a phase of the second CM baseband signal using the phase difference.

18. The system of claim 17, wherein the phase discriminator includes:
a complex conjugate operator to operate on the second CM baseband signal;
a multiplier to obtain a product of the first CM baseband signal and the complex conjugate of the second CM baseband signal; and
a coordinate rotation digital computer (CORDIC) engine to obtain an instantaneous phase difference from the product.

* * * * *